US012073965B2

(12) United States Patent
Koelblin et al.

(10) Patent No.: US 12,073,965 B2
(45) Date of Patent: Aug. 27, 2024

(54) WATER TREE RESISTANT ELECTRIC CABLE

(71) Applicant: NEXANS, Courbevoie (FR)

(72) Inventors: Christian Koelblin, Meximieux (FR); Melek Maugin, Chassagny (FR)

(73) Assignee: NEXANS, Courbevoie (FR)

( * ) Notice: Subject to any disclaimer, the term of this patent is extended or adjusted under 35 U.S.C. 154(b) by 290 days.

(21) Appl. No.: 16/722,804

(22) Filed: Dec. 20, 2019

(65) Prior Publication Data

US 2020/0251251 A1 Aug. 6, 2020

(30) Foreign Application Priority Data

Dec. 21, 2018 (FR) ..................................... 18 73876

(51) Int. Cl.
*H01B 3/00* (2006.01)
*H01B 3/30* (2006.01)
*H01B 7/28* (2006.01)

(52) U.S. Cl.
CPC ............. *H01B 7/2813* (2013.01); *H01B 3/30* (2013.01)

(58) Field of Classification Search
CPC ........................................................ H01B 3/00
See application file for complete search history.

(56) References Cited

U.S. PATENT DOCUMENTS 3,936,416 A * 2/1976 Brady ....................... C08K 5/05 524/387
4,456,655 A * 6/1984 Beasley ................... C08K 5/12 428/383
6,521,695 B1 * 2/2003 Peruzzotti ................ C08K 5/17 524/505
2008/0190643 A1 8/2008 Lumachi et al.
2012/0279753 A1 * 11/2012 Kambe .................. H01B 7/292 174/110 SR
2013/0344329 A1 12/2013 Perego et al.
2014/0272115 A1 * 9/2014 Shaffer ................ G02B 6/4486 385/100
2015/0368467 A1 * 12/2015 Dullaert .................. C08L 77/02 524/413
2016/0336090 A1 * 11/2016 Perego ................... H01B 3/441
2018/0362749 A1 * 12/2018 Perego ..................... C08K 5/07
2018/0374602 A1 12/2018 Perego et al.

FOREIGN PATENT DOCUMENTS

CA 2004721 * 6/1990
WO WO 2011/154287 * 12/2011

OTHER PUBLICATIONS

International Search Report dated Aug. 22, 2019.

* cited by examiner

*Primary Examiner* — Chau N Nguyen
(74) *Attorney, Agent, or Firm* — Sofer & Haroun, LLP

(57) ABSTRACT

An electric cable includes at least one polymer layer obtained from a polymer composition having at least one polypropylene-based thermoplastic polymer material and at least one oxygen-containing compound having a melting temperature of about 110° C. or higher.

13 Claims, 1 Drawing Sheet

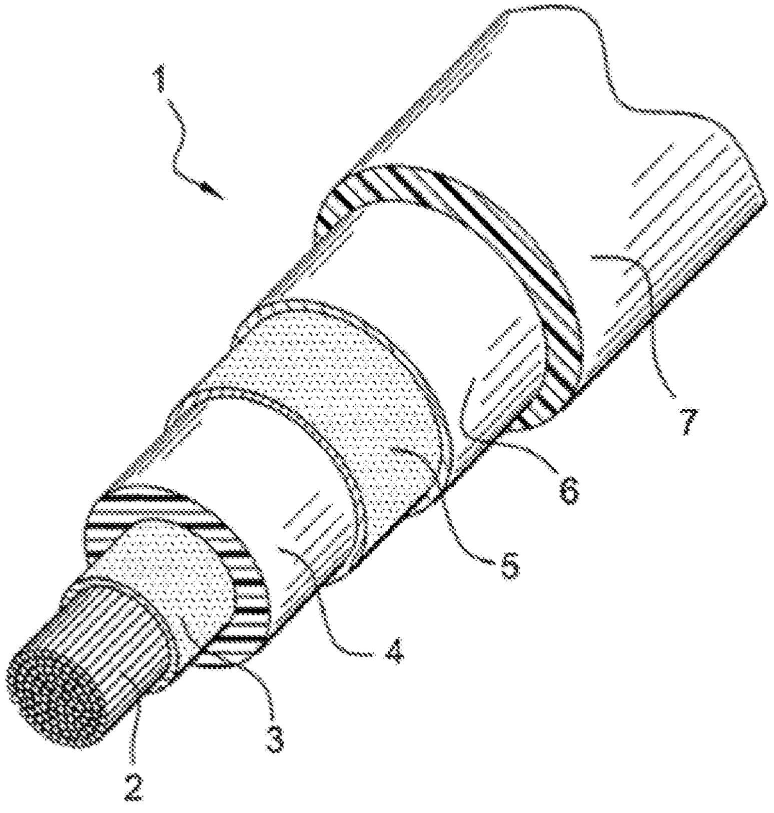
1
2
3
4
5
6
7

WATER TREE RESISTANT ELECTRIC CABLE

RELATED APPLICATION

This application claims the benefit of priority from French Patent Application No. 18 73876, filed on Dec. 21, 2018, the entirety of which is incorporated by reference.

BACKGROUND

Field of the Invention

The invention concerns an electric cable comprising at least one polymer layer obtained from a polymer composition comprising at least one polypropylene-based thermoplastic polymer material and at least one oxygen-containing compound having a melting temperature of about 110° C. or higher.

The invention typically but not exclusively applies to electric cables intended for power transmission, in particular medium-voltage (in particular from 6 to 45-60 kV) or high-voltage (in particular above 60 kV, and up to 400 kV) power cables, whether direct current or alternating current, in the fields of air, underwater, land or aeronautical power transmission. The invention applies in particular to electric cables with improved resistance to ageing in a wet environment under electrical voltage.

Description of Related Art

Medium- and high-voltage power cables may come into contact with the surrounding dampness during their lifetime. The presence of moisture combined with the presence of an electric field and a polymer material promotes the progressive degradation of the cable's insulating properties. This degradation mechanism, well known as "water treeing", can thus lead to the breakdown of the cable concerned and therefore constitutes a considerable threat to the reliability of the energy transmission network with well-known economic consequences caused by power failures.

Many compounds with various chemical structures that reduce the formation of water trees have been proposed in polyethylene-based cables, particularly cross-linked polyethylene (XLPE type cables). In particular, document U.S. Pat. No. 4,305,849 describes the use of a polyethylene glycol with a molecular weight ranging from 1000 to 20000 g/mol in a polyethylene-based insulating layer or a copolymer of ethylene and vinyl acetate. However, this solution is not suitable for a polypropylene-based cable, in particular a cable comprising at least one polymer layer obtained from a composition comprising a polypropylene matrix. Indeed, such polypropylene-based cables are generally manufactured at high temperatures, particularly around 200° C., which can lead to the deterioration of such a compound, reducing the formation of water trees.

Objects and Summary

The aim of the present invention is therefore to overcome the disadvantages of prior art techniques by offering a propylene-based polymer electric cable, in particular a medium- or high-voltage cable, which has improved resistance to ageing in a wet environment in the presence of an electric field, and preferably while guaranteeing good mechanical properties.

The aim is achieved by the invention which will be described below.

The first aim of the invention is an electric cable comprising at least one elongated electrically conductive element, and at least one polymer layer surrounding said elongated electrically conductive element, characterised in that the polymer layer is obtained from a polymer composition comprising at least one polypropylene-based thermoplastic polymer material and at least one oxygen-containing compound having a melting temperature of about 110° C. or more.

Thus, thanks to the presence of an oxygen-containing compound having a melting temperature of about 110° C. or more within a polypropylene-based polymer layer of an electric cable, the resistance to ageing in a wet environment in the presence of an electric field is significantly improved, preferably while guaranteeing good mechanical properties.

The Oxygen-Containing Compound Having a Melting Temperature of 110° C. or More

Said oxygen-containing compound is used in particular as a water tree reducing agent. It is solid at room temperature, or, in other words, at a temperature of about 18 to 25° C. For example, a compound that is liquid at room temperature may show an increased tendency to migration, and/or may be degraded during implementation, particularly due to limited thermal stability.

The oxygen-containing compound has good chemical stability, which can advantageously allow it to avoid any deterioration during the manufacture of the cable of the invention.

Generally, the antioxidants used in the field of cable polymer layers are not water tree reducing agents.

Indeed, antioxidants are consumed during the cable manufacturing process and in the course of the life of the cable during periods where said cable is submitted to elevated temperatures. On the contrary, water tree reducing agents must remain stable and present in the cable as long as possible so as to be effective.

According to a preferred embodiment of the invention, the oxygen-containing compound has a melting temperature of about 120° C. or more, a particularly preferred melting temperature of about 126° C. or more, and a very particularly preferred melting temperature of about 130° C. or more.

The oxygen-containing compound is preferably an organic compound, and particularly preferably a non-metallic compound.

The oxygen-containing compound can be a polymer or non-polymer material.

The oxygen-containing compound can have a molecular weight ranging from about 200 to 5000000 g/mol.

When the oxygen-containing compound is a polymer material, its molecular weight is more particularly from about 10000 to 5000000 g/mol.

When the oxygen-containing compound is a non-polymer material, its molecular weight is more particularly in the range of about 200 to 5000 g/mol.

The oxygen-containing compound has a melting temperature. In other words, said oxygen-containing compound is a crystalline or semi-crystalline compound.

In the present invention, the melting temperature of the oxygen-containing compound is easily measurable by techniques well known to the skilled person, such as differential scanning calorimetry (DSC), drop point measurement according to ISO 2176 or ASTM D 3954, and/or softening point measurement according to ASTM D 3104, for example.

The term "oxygen-containing compound" means a compound comprising at least one oxygen atom, and preferably comprising several oxygen atoms.

The oxygen-containing compound may include one or more functions selected from the functions alcohol, ester, acid, acid anhydride, and one of their mixtures, and preferably from the functions alcohol and acid anhydride.

The oxygen-containing compound is preferably different from a hindered phenol. In other words, the oxygen-containing compound preferably does not comprise phenol comprising tert-butyl groups in the two adjacent positions to the hydroxyl group of the phenol.

According to a particularly preferred embodiment, the oxygen-containing compound is selected from polyols, polyolefins functionalised by acid anhydride functions, and polyester waxes, and more preferably selected from polyols and polyolefins functionalised by acid anhydride functions.

Polyols can be selected from polyols containing 3 to 40 carbon atoms, preferably 3 to 20 carbon atoms, and particularly preferably 3 to 10 carbon atoms.

Among polyols, aliphatic polyols and polyols containing at least two primary alcohol functions ($—CH_2OH$) are particularly preferred.

Examples of polyols include dipentaerythritol, neopentyl glycol, or di-trimethylolpropane.

Dipentaerythritol is preferred.

Polyolefins functionalised by acid anhydride functions can be selected from homo- and copolymers of ethylene functionalised by acid anhydride functions, and homo- and copolymers of propylene functionalised by acid anhydride functions, preferably from homo- and copolymers of propylene functionalised by acid anhydride functions, and particularly preferably from homopolymers of propylene functionalised by acid anhydride functions. Homopolymers of propylene functionalised by acid anhydride functions display improved performances in terms of resistance to ageing in a wet environment under electrical voltage The acid anhydride functions are advantageously the functions maleic anhydride, acetic anhydride or phthalic anhydride, and preferably maleic anhydride.

The polyolefins functionalised by acid anhydride functions can have a saponification index ranging from about 5 to 90, preferably ranging from about 40 to 90, and more preferably ranging from about 60 to 90.

The polyolefins functionalised by acid anhydride functions are preferably obtained by metallocene catalysis.

The polyester waxes can be selected from polyolefins functionalised by ester functions, and preferably homo- and copolymers of ethylene functionalised by ester functions.

The polymer composition may comprise from about 0.1 to 15% by weight, preferably from about 0.1 to 10% by weight, and particularly preferably from about 0.2 to 7% by weight, of oxygen-containing compound based on the total weight of the polymer composition.

According to a first variant, the oxygen-containing compound is a polyol, in particular as defined in the invention.

When the oxygen-containing compound is a polyol, the polymer composition may comprise about 0.1 to 5% by weight of polyol, and preferably about 0.2 to 5% by weight of polyol, based on the total weight of the polymer composition.

According to a second variant, the oxygen-containing compound is a polyolefin functionalised by acid anhydride functions, in particular as defined in the invention.

When the oxygen-containing compound is a polyolefin functionalised with acid anhydride functions, the polymer composition may comprise about 1 to 10% by weight of polyolefin functionalised with acid anhydride functions, and preferably about 1 to 7% by weight of polyolefin functionalised with acid anhydride functions, based on the total weight of the polymer composition.

According to a third variant, the oxygen-containing compound is a polyester wax, in particular as defined in the invention.

When the oxygen-containing compound is a polyester wax, the polymer composition may comprise from about 0.5 to 10% by weight of polyester wax, based on the total weight of the polymer composition.

The oxygen-containing compound may have a melting temperature of or not more than about 250° C., preferably of or not more than about 230° C., particularly preferably of or not more than 200° C., and more preferably of or not more than about 190° C. This can be useful in facilitating the mixing of ingredients during the preparation of the polymer composition and the manufacturing of the cable.

According to a particular preferred embodiment of the invention, the oxygen-containing compound is selected from aliphatic polyols, polyols containing at least two primary alcohol functions, and homo- and copolymers of propylene functionalised by acid anhydride functions.

The Polypropylene-Based Thermoplastic Polymer Material

The polypropylene-based thermoplastic polymer material may include a propylene homopolymer or copolymer $P_1$, and preferably a propylene copolymer $P_1$.

The propylene homopolymer $P_1$ preferably has an elastic modulus ranging from about 1250 to 1600 MPa.

The propylene homopolymer $P_1$ can represent at least about 10% by weight, and preferably about 15 to 30% by weight, based on the total weight of the polypropylene-based thermoplastic polymer material.

Examples of propylene copolymers $P_1$ include propylene and olefin copolymers, with olefin being selected in particular from ethylene and an olefin $\alpha_1$ different from propylene.

The ethylene or olefin $\alpha_1$ different from propylene of the propylene-olefin copolymer preferably represents at most about 15% by mole, and particularly preferably at most about 10% by mole, based on the total number of moles of propylene-olefin copolymer.

The olefin $\alpha_1$ different from propylene may have the formula $CH_2{=}CH—R^1$, wherein $R^1$ is a linear or branched alkyl group having from 2 to 12 carbon atoms, particularly selected from the following olefins $\alpha_1$: 1-butene, 1-pentene; 4-methyl-1-pentene, 1-hexene, 1-octene, 1-decene, 1-dodecene, and one of their mixtures.

Propylene and ethylene copolymers are preferred as propylene copolymers $P_1$.

The propylene copolymer $P_1$ can be a random propylene copolymer or a heterophasic propylene copolymer.

In the invention, the random propylene copolymer $P_1$ preferably has an elastic modulus ranging from about 600 to 1200 MPa.

One example of a random propylene copolymer is the one marketed by Borealis with the product name Bormed® RB 845 MO.

The heterophasic propylene copolymer may comprise a thermoplastic phase of propylene type and a thermoplastic elastomer phase of ethylene-olefin $\alpha_2$ copolymer type.

The olefin $\alpha_2$ of the thermoplastic elastomer phase of the heterophasic copolymer may be propylene.

The thermoplastic elastomer phase of the heterophasic copolymer can represent at least about 20% by weight, and preferably at least about 45% by weight, based on the total weight of the heterophasic copolymer.

The heterophasic propylene copolymer preferably has an elastic modulus ranging from about 50 to 1200 MPa, and particularly preferably: either an elastic modulus ranging from about 50 to 550 MPa, and more particularly preferably ranging from about 50 to 250 MPa; or an elastic modulus ranging from about 600 to 1200 MPa.

One example of a heterophasic copolymer is the heterophasic copolymer marketed by LyondellBasell with the product name Adflex® Q 200 F, or the heterophasic copolymer marketed by LyondellBasell with the product name EP® 2967.

The propylene homopolymer or copolymer $P_1$ may have a melting temperature greater than about 110° C., preferably greater than about 130° C., particularly preferably greater than or equal to about 140° C., and more particularly preferably ranging from about 140 to 170° C.

The propylene homopolymer or copolymer $P_1$ can have a melting enthalpy of about 20 to 100 J/g.

In particular, the propylene homopolymer $P_1$ has a melting enthalpy of about 80 to 90 J/g.

The random propylene copolymer $P_1$ can have a melting enthalpy of about 40 to 80 J/g.

The heterophasic propylene copolymer $P_1$ can have a melting enthalpy of about 20 to 50 J/g.

The propylene homopolymer or copolymer $P_1$ can have a melt flow index ranging from about 0.5 to 3 g/10 min, measured at about 230° C. with a load of about 2.16 kg according to ASTM D1238-00.

The random propylene copolymer $P_1$ can have a melt flow index ranging from about 1.2 to 2.5 g/10 min, and preferably from 1.5 to 2.5 g/10 min, measured at about 230° C. with a load of about 2.16 kg according to ASTM D1238-00.

The heterophasic propylene copolymer $P_1$ can have a melt flow index ranging from about 0.5 to 1.5 g/10 min, and preferably from about 0.5 to 1.4 g/10 min, measured at about 230° C. with a load of about 2.16 kg according to ASTM D1238-00.

The polypropylene-based thermoplastic polymer material can comprise several different propylene polymers, such as several different propylene homopolymers $P_1$, at least one propylene homopolymer $P_1$ and at least one propylene copolymer $P_1$, or several different propylene copolymers $P_1$, for example.

The polypropylene-based thermoplastic polymer material preferably comprises at least about 50% by weight, preferably about 55 to 90% by weight, and particularly preferably about 60 to 90% by weight, of propylene polymer(s), based on the total weight of the polypropylene-based thermoplastic polymer material.

When the polypropylene-based thermoplastic polymer material comprises several different propylene copolymers $P_1$, it preferably comprises two different propylene copolymers $P_1$, said propylene copolymers $P_1$ being as defined above.

In particular, the polypropylene-based thermoplastic polymer material may include a random propylene copolymer (as first propylene copolymer $P_1$) and a heterophasic propylene copolymer (as second propylene copolymer $P_1$), or two different heterophasic propylene copolymers.

When the polypropylene-based thermoplastic polymer material comprises a random propylene copolymer and a heterophasic propylene copolymer, said heterophasic propylene copolymer preferably has an elastic modulus ranging from about 600 to 1200 MPa.

According to an embodiment of the invention, the two heterophasic propylene copolymers have a different elastic modulus. Preferably, the polypropylene-based thermoplastic polymer material comprises a first heterophasic propylene copolymer having an elastic modulus of about 50 to 550 MPa, and particularly preferably of about 50 to 250 MPa; and a second heterophasic propylene copolymer having an elastic modulus of about 600 to 1200 MPa.

Advantageously, the first and second heterophasic propylene copolymers have a melt flow index as defined in the invention.

These combinations of propylene copolymers $P_1$ can be used advantageously to improve the mechanical properties of the polymer layer. In particular, the combination makes it possible to obtain optimised mechanical properties of the polymer layer, in particular in terms of elongation at break and flexibility; and/or to form a more homogeneous polymer layer, in particular to promote the dispersion of the dielectric liquid in the polypropylene-based thermoplastic polymer material of said polymer layer.

According to a preferred embodiment of the invention, the propylene copolymer $P_1$ or the propylene copolymers $P_1$ when there are several of them, represent(s) at least about 50% by weight, preferably about 55 to 90% by weight, and particularly preferably about 60 to 90% by weight, based on the total weight of the polypropylene-based thermoplastic polymer material.

The random propylene copolymer $P_1$ can represent at least about 20% by weight, and preferably about 30 to 70% by weight, based on the total weight of the polypropylene-based thermoplastic polymer material.

The heterophasic propylene copolymer $P_1$, or heterophasic propylene copolymers $P_1$ when there are several of them, may represent from about 5 to 95% by weight, preferably from about 50 to 90% by weight, and particularly preferably from about 60 to 80% by weight, based on the total weight of the polypropylene-based thermoplastic polymer material.

The polypropylene-based thermoplastic polymer material may further comprise a olefin homopolymer or copolymer $P_2$, the olefin being selected in particular from ethylene and an olefin $\alpha_3$ having the formula $CH_2{=}CH{-}R^2$, wherein $R^2$ is a linear or branched alkyl group having from 1 to 12 carbon atoms.

Said olefin homopolymer or copolymer $P_2$ is preferably different from said propylene homopolymer or copolymer $P_1$.

The olefin $\alpha_3$ is preferably selected from the following olefins: propylene, 1-butene, isobutylene, 1-pentene, 4-methyl-1-pentene, 1-hexene, 1-octene, 1-decene, 1-dodecene, and one of their mixtures.

The olefin $\alpha_3$ of propylene, 1-hexene or 1-octene type is particularly preferred.

According to an advantageous embodiment of the invention, $R^2$ is a linear or branched alkyl group having from 2 to 8 carbon atoms.

The combination of polymers $P_1$ and $P_2$ makes it possible to obtain a thermoplastic polymer material with good mechanical properties, particularly in terms of elastic modulus, and good electrical properties.

The olefin homopolymer or copolymer $P_2$ is preferably an ethylene polymer.

The ethylene polymer may be an ethylene or low-density polyethylene polymer, a medium-density polyethylene, or a high-density polyethylene, and preferably a linear low-density polyethylene; in particular according to ISO 1183A (at a temperature of 23° C.).

In the present invention, the term "low density" means having a density ranging from about 0.91 to 0.925, said density being measured according to ISO 1183A (at a temperature of 23° C.).

In the present invention, the term "medium density" means having a density ranging from about 0.926 to 0.940, said density being measured according to ISO 1183A (at a temperature of 23° C.).

In the present invention, the term "high density" means having a density ranging from 0.941 to 0.965, said density being measured according to ISO 1183A (at a temperature of 23° C.).

According to a preferred embodiment of the invention, the olefin homopolymer or copolymer $P_2$ represents about 5 to 50% by weight, and particularly preferably about 10 to 40% by weight, based on the total weight of the polypropylene-based thermoplastic polymer material.

According to a particularly preferred embodiment of the invention, the polypropylene-based thermoplastic polymer material comprises two propylene copolymers $P_1$ such as a random propylene copolymer and a heterophasic propylene copolymer or two different heterophasic propylene copolymers; and an olefin homopolymer or copolymer $P_2$ such as an ethylene polymer. This combination of propylene copolymers $P_1$ and an olefin homopolymer or copolymer $P_2$ further improves the mechanical properties of the polymer layer, while ensuring good thermal conductivity.

The thermoplastic polymer material of the polymer composition of the polymer layer of the cable of the invention is preferably heterophasic (i.e. it comprises several phases). The presence of several phases generally results from the mixing of two different polyolefins, such as a mixture of different propylene polymers or a mixture of a propylene polymer and an ethylene polymer.

The thermoplastic polymer material as defined in the invention represents the polymer material of the polymer composition of the invention.

The Dielectric Liquid

The polymer composition of the invention may also include a dielectric liquid, in particular forming an intimate mixture with the thermoplastic polymer material.

Examples of dielectric liquids include mineral oils (e.g. naphthenic oils, paraffinic oils or aromatic oils), vegetable oils (e.g. soybean oil, linseed oil, rapeseed oil, corn oil or castor oil) or synthetic oils such as aromatic hydrocarbons (alkylbenzenes, alkylnaphthalenes, alkylbiphenyls, alkydiaryl ethylenes, etc.), silicone oils, ether-oxides, organic esters or aliphatic hydrocarbons.

According to a particular embodiment, the dielectric liquid represents about 1% to 20% by weight, preferably about 2 to 15% by weight, and particularly preferably about 3 to 12% by weight, based on the total weight of the thermoplastic polymer material.

The dielectric liquid may include a mineral oil and at least one polar compound of type benzophenone, acetophenone or one of their derivatives.

In this embodiment, the dielectric liquid may comprise at least about 70% by weight of mineral oil, preferably at least about 80% by weight of mineral oil, and particularly preferably at least about 90% by weight of mineral oil based on the total weight of the dielectric liquid.

The mineral oil is generally liquid at about 20-25° C.

The mineral oil can be selected from naphthenic oils and paraffinic oils.

The mineral oil is obtained from the refining of a petroleum crude oil.

According to a particularly preferred embodiment of the invention, the mineral oil comprises a paraffinic carbon (Cp) content ranging from about 45 to 65% atomic, a naphthenic carbon (Cn) content ranging from about 35 to 55% atomic and an aromatic carbon (Ca) content ranging from about 0.5 to 10% atomic.

In a particular embodiment, the polar compound of type benzophenone, acetophenone or one of their derivatives represents at least about 2.5% by weight, preferably at least about 3.5% by weight, and even more preferentially at least about 4% by weight, based on the total weight of the dielectric liquid.

According to a preferred embodiment of the invention, the polar compound of type benzophenone, acetophenone or one of their derivatives is selected from benzophenone, dibenzosuberone, fluorenone and anthrone. Benzophenone is particularly preferred.

In the invention, the oxygen-containing compound is compatible with the dielectric liquids generally used in thermoplastic polypropylene-based cables.

Additives

The thermoplastic polymer material may also include one or more additives.

Additives are well known to the skilled person and can be selected from implementation-enhancing agents such as lubricants, compatibilisers, or coupling agents, antioxidants, anti-UV agents, anti-copper agents, pigments, and one of their mixtures.

The thermoplastic polymer material can typically comprise about 0.01 to 5% by weight, and preferably about 0.1 to 2% by weight of additives, based on the total weight of the thermoplastic polymer material.

More specifically, the antioxidants protect the polymer composition from thermal stresses generated during the cable manufacturing or cable operation steps.

The antioxidants are preferably selected from hindered phenols, sulphur antioxidants, phosphorus antioxidants, amine type antioxidants, and one of their mixtures.

Examples of hindered phenols include pentaerythritol tetrakis(3-(3,5-di-tert-butyl-4-hydroxyphenyl)propionate) (Irganox® 1010), octadecyl 3-(3,5-di-tert-butyl-4-hydroxyphenyl)propionate (Irganox® 1076), 1,3,5-trimethyl-2,4,6-tris(3,5-di-tert-butyl-4-hydroxybenzyl)benzene (Irganox® 1330), 4,6-bis (octylthiomethyl)-o-cresol (Irgastab® KV10 or Irganox® 1520), 2,2'-thiobis(6-tert-butyl-4-methylphenol) (Irganox® 1081), 2,2'-thiodiethylene bis[3-(3,5-di-tert-butyl-4-hydroxyphenyl)propionate] (Irganox® 1035), tris (3,5-di-tert-butyl-4-hydroxybenzyl)isocyanurate (Irganox® 3114), or 2,2'-methylenebis(6-tert-butyl-4-methylphenol).

Examples of sulphur antioxidants include thioethers such as didodecyl-3,3'-thiodipropionate (Irganox® PS800), distearyl thiodipropionate or dioctadecyl-3,3'-thiodipropionate (Irganox® PS802), bis[2-methyl-4-{3-n-alkyl ($C_{12}$ or $C_{14}$) thiopropionyloxy}-5-tert-butylphenyl]sulphide, thiobis-[2-tert-butyl-5-methyl-4,1-phenylene] bis [3-(dodecylthio)propionate], or 4,6-bis(octylthiomethyl)-o-cresol (Irganox® 1520 or Irgastab® KV10).

Examples of phosphorus antioxidants include phosphites or phosphonates, such as tris(2,4-di-tert-butyl-phenyl)phosphite (Irgafos® 168) or bis(2,4-di-tert-butylphenyl)pentaerythritol diphosphite (Ultranox® 626).

Examples of amine type antioxidants include phenylene diamines (e.g. paraphenylene diamines such as 1PPD or 6PPD), diphenylamine styrene, diphenylamines, 4-(1-methyl-1-phenylethyl)-N-[4-(1-methyl-1-phenylethyl)phenyl]aniline (Naugard 445), mercapto benzimidazoles, or polymerised 2,2,4-trimethyl-1,2-dihydroquinoline (TMQ).

Examples of antioxidant mixtures that can be used according to the invention include Irganox B 225, which includes an equimolar mixture of Irgafos 168 and Irganox 1010 as described above.

The polymer composition of the polymer layer of the invention is a thermoplastic polymer composition. It is therefore not curable.

In particular, the polymer composition does not include crosslinking agents, silane type coupling agents, peroxides and/or additives that allow crosslinking. Indeed, such agents degrade the polypropylene-based thermoplastic polymer material.

The polymer composition is preferably recyclable.

The composition may also include inert inorganic fillers such as chalk, kaolin or talc; and/or halogen-free mineral fillers intended to improve the fire performance of the polymer composition.

Inert inorganic fillers and/or halogen-free inorganic fillers may represent at most about 30% by weight, preferably at most about 20% by weight, particularly preferably at most about 10% by weight, and more particularly preferably at most about 5% by weight, based on the total weight of the polymer composition.

In order to guarantee a so-called halogen-free flame retardant (HFFR) electric cable, the cable of the invention does not preferentially include halogenated compounds. These halogenated compounds can be of any kind, such as fluorinated polymers or chlorinated polymers such as polyvinyl chloride (PVC), halogenated plasticisers, halogenated mineral fillers, etc.

The polymer composition can be prepared by mixing the polypropylene-based thermoplastic polymer material with at least one oxygen-containing compound as defined in the invention, optionally a dielectric liquid and optionally one or more additives as defined in the invention.

The Polymer Layer and the Cable

The polymer layer of the cable of the invention is a non-crosslinked layer or, in other words, a thermoplastic layer.

In the invention, the term "non-crosslinked layer" or "thermoplastic layer" means a layer whose gel rate according to ASTM D2765-01 (xylene extraction) is at most about 30%, preferably at most about 20%, particularly preferably at most about 10%, more particularly preferably at most about 5%, and even more particularly preferably at most 0%.

In an embodiment of the invention, the polymer layer, preferably non-crosslinked, has a breakdown voltage after ageing in a wet environment of at least about 42 kV/mm, preferably at least about 45 kV/mm, particularly preferably at least about 50 kV/mm, and more particularly preferably at least about 70 kV/mm.

The breakdown voltage after ageing in a wet environment is measured by a test on model cables according to the method described in the document "*Model Cable Test for Evaluating the Ageing Behaviour under Water Influence of Compounds for Medium Voltage Cables*", H. G. Land and Hans Schädlich, pages 177 to 182, published during the "Conference Proceedings of Jicable 91", 24-28 Jun. 1991, in Versailles, France.

In a particularly preferred embodiment of the invention, the polymer layer, preferably non-crosslinked, has a reduction in breakdown voltage after ageing in a wet environment of at most about 30%, preferably at most 20%, and particularly preferably at most about 18%.

In a particular embodiment, the polymer layer, preferably non-crosslinked, has a tensile strength (TS) of at least 12.5 MPa, especially before or after ageing (according to IEC 20-86).

In a particular embodiment, the polymer layer, preferably non-crosslinked, has an elongation at break (EB) of at least 200%, particularly before or after ageing (according to IEC 20-86).

Tensile strength (TS) and elongation at break (EB) measurements (before or after ageing) can be carried out in accordance with Standard NF EN 60811-1-1, in particular using a device marketed under the product number 3345 by Instron.

The polymer layer of the cable of the invention is preferably a recyclable layer.

The polymer layer of the invention may be an extruded layer, in particular by processes well known to the skilled person.

The polymer layer of the cable of the invention may be an electrically insulating layer or a semi-conductive layer.

Where the polymer layer is a semi-conductive layer, the polymer composition as defined in the invention includes at least one conductive filler, in particular in sufficient amount to render the layer semi-conductive.

The polymer composition may, for example, comprise at least about 6% by weight of conductive filler, preferably at least about 10% by weight of conductive filler, preferably at least about 15% by weight of conductive filler, and even more preferentially at least about 25% by weight of conductive filler, based on the total weight of the polymer composition.

The polymer composition may comprise at most about 45% by weight of conductive filler, and preferably at most about 40% by weight of conductive filler, based on the total weight of the polymer composition.

The conductive filler is preferably an electrically conductive filler.

The conductive filler can be selected advantageously from carbon blacks, graphites, and one of their mixtures.

According to a particularly preferred embodiment of the invention, the polymer layer is an electrically insulating polymer layer.

The polymer composition may then comprise less than about 6% by weight of conductive filler, preferably less than about 1% by weight of conductive filler, and even more preferentially about 0% by weight of conductive filler, based on the total weight of the polymer composition.

The polymer layer, in particular the electrically insulating polymer layer, has a variable thickness depending on the type of cable being considered. In particular, when the cable according to the invention is a medium-voltage cable, the thickness of the electrically insulating polymer layer is typically about 3 to 5.5 mm, and more particularly about 4.5 mm. When the cable according to the invention is a high-voltage cable, the thickness of the electrically insulating polymer layer typically varies from 15 to 18 mm (for voltages of about 150 kV) and up to thicknesses of about 20 to 25 mm for voltages above 150 kV (very-high-voltage cables). The above-mentioned thicknesses depend on the size of the elongated electrically conductive element.

In the present invention, "electrically insulating layer" means a layer whose electrical conductivity may not exceed $1 \cdot 10^{-8}$ S/m (siemens per metre), preferably not exceeding $1 \cdot 10^{-9}$ S/m, and particularly preferably not exceeding $1 \cdot 10^{-10}$ S/m (siemens per metre), measured at 25° C. in direct current.

The polymer layer of the invention may include at least one polypropylene-based thermoplastic polymer material, at least one oxygen-containing compound having a melting temperature of about 110° C. or higher, optionally one or more additives, and optionally at least one conductive filler, the above-mentioned ingredients being as defined in the invention.

The proportions of the different ingredients in the polymer layer may be identical to those described in the invention for the same ingredients in the polymer composition.

The polymer layer of the cable of the invention surrounds the elongated electrically conductive element.

The elongated electrically conductive element can be a single-strand conductor such as a metal wire or a multi-strand conductor such as a plurality of optionally twisted metal wires, for example.

The elongated electrically conductive element can be made of aluminium, aluminium alloy, copper, copper alloy, or one of their combinations.

The electric cable may include:

- at least one semi-conductive layer surrounding the elongated electrically conductive element, and
- at least one electrically insulating layer surrounding the elongated electrically conductive element, at least one of the semi-conductive and electrically insulating layers being a polymer layer as defined in the invention.

The electrically insulating layer has more particularly a lower electrical conductivity than the semi-conductive layer. More particularly, the electrical conductivity of the semi-conductive layer may be at least 10 times higher than the electrical conductivity of the electrically insulating layer, preferably at least 100 times higher than the electrical conductivity of the electrically insulating layer, and particularly preferably at least 1000 times higher than the electrical conductivity of the electrically insulating layer.

The semi-conductive layer can surround the electrically insulating layer. The semi-conductive layer can then be an external semi-conductive layer.

The electrically insulating layer can surround the semi-conductive layer. The semi-conductive layer can then be an internal semi-conductive layer.

The semi-conductive layer is preferably an internal semi-conductive layer.

The electric cable of the invention may also include another semi-conductive layer.

Thus, in this embodiment, the cable of the invention may include:

- at least one elongated electrically conductive element, in particular positioned in the centre of the cable,
- a first semi-conductive layer surrounding the elongated electrically conductive element,
- an electrically insulating layer surrounding the first semi-conductive layer, and
- a second semi-conductive layer surrounding the electrically insulating layer, at least one of the semi-conductive and electrically insulating layers being a polymer layer as defined in the invention, and preferably at least the electrically insulating layer being a polymer layer as defined in the invention.

In the present invention, "semi-conductive layer" means a layer whose electrical conductivity may be strictly greater than $1 \cdot 10^{-8}$ S/m (siemens per metre), preferably at least $1 \cdot 10^{-3}$ S/m, and preferably less than $1 \cdot 10^{3}$ S/m, measured at 25° C. in direct current.

In a particular embodiment, the first semi-conductive layer, the electrically insulating layer and the second semi-conductive layer constitute a three-layer insulation. In other words, the electrically insulating layer is in direct physical contact with the first semi-conductive layer, and the second semi-conductive layer is in direct physical contact with the electrically insulating layer.

When the polymer layer as defined in the invention is an electrically insulating layer, the first and/or second semi-conductive layer(s) is (are) preferably obtained from a polymer composition comprising at least one polypropylene-based thermoplastic polymer material as defined in the invention, and optionally at least one conductive filler as defined in the invention.

The first and/or second semi-conductive layer(s) is (are) preferably thermoplastic or non-crosslinked layers.

The cable may also include an outer protective sheath surrounding the second semi-conductive layer and may be in direct physical contact with it.

The outer protective sheath can be an electrically insulating sheath.

The electric cable may also include an electric (e.g. metal) shield surrounding the second semi-conductive layer. In this case, the electrically insulating sheath surrounds said electric shield and the electric shield is between the electrically insulating sheath and the second semi-conductive layer.

This metal shield can be a so-called "wire" shield composed of a set of copper or aluminium conductors arranged around and along the second semi-conductive layer, a so-called "banded" shield composed of one or more conductive metal strips made of copper or aluminium, optionally laid in a helix around the second semi-conductive layer, or a conductive metal strip made of aluminium laid longitudinally around the second semi-conductive layer and sealed with glue in the overlapping areas of parts of said strip, or a so-called "sealed" shield of the metal tube type optionally made of lead or lead alloy and surrounding the second semi-conductive layer. This last type of shield is used in particular to protect against moisture that tends to penetrate the electric cable in a radial direction.

The metal shield of the electric cable of the invention may include a so-called "wire" shield and a so-called "sealed" shield or a so-called "wire" shield and a so-called "banded" shield.

All types of metal shields can act as earthing devices for the electric cable and can thus carry fault currents, for example in the event of a short circuit in the network concerned.

Other layers, such as layers that swell in the presence of moisture, can be added between the second semi-conductive layer and the metal shield, these layers ensuring the longitudinal watertightness of the electric cable.

The cable of the invention concerns more particularly the field of electric cables operating in direct current (DC) or alternating current (AC).

The electric cable conforming to the first object of the invention can be obtained by a process comprising at least one step 1) of extruding the polymer composition as defined in the first object of the invention around an elongated electrically conductive element, to obtain an (extruded) polymer layer surrounding said elongated electrically conductive element.

Step 1) can be carried out by techniques well known to the skilled person, for example using an extruder.

In step 1), the composition at the extruder exit is said to be "non-crosslinked", the temperature and the implementation time within the extruder being optimised accordingly.

At the extruder exit, an extruded layer is thus obtained around said electrically conductive element, which is optionally in direct physical contact with said elongated electrically conductive element.

The process preferably does not include a step of cross-linking the layer obtained in step 1).

The electrically insulating layer and/or the semi-conductive layer(s) of the electric cable of the invention may be obtained by successive extrusion or by co-extrusion.

Prior to the extrusion of each of these layers around at least one elongated electrically conductive element, all the components necessary for the formation of each of these layers can be metered and mixed in a continuous mixer of type BUSS co-kneader, twin-screw extruder or another type of mixer suitable for polymer mixtures, in particular filled. The mixture can then be extruded in the form of rods, then cooled and dried to form granules, or the mixture can be put directly in the form of granules, using techniques well known to the skilled person. These granules can then be introduced into a single-screw extruder to extrude and deposit the composition around the elongated electrically conductive element to form the layer in question.

The different compositions can be extruded one after the other to successively surround the elongated electrically conductive element, and thus form the different layers of the electric cable of the invention.

They can alternatively be extruded concomitantly by co-extrusion using a single extruder head, co-extrusion being a process well known to the skilled person.

Whether in the granulate formation step or in the cable extrusion step, the operating conditions are well known to the skilled person. In particular, the temperature within the mixing or extrusion device may be higher than the melting temperature of the majority polymer or of the polymer with the highest melting temperature among the polymers used in the composition to be employed.

BRIEF DESCRIPTION OF THE DRAWINGS

FIG. 1 shows a schematic view of an electric cable according to a preferred embodiment in accordance with the invention.

For reasons of clarity, only the elements essential for understanding the invention have been represented schematically, and are not to scale.

DETAILED DESCRIPTION

The medium- or high-voltage electric cable 1 conforming to the first object of the invention, shown in FIG. 1, comprises a central elongated electrically conductive element 2, in particular of copper or aluminium. The electric cable 1 further comprises several layers arranged successively and coaxially around this central elongated electrically conductive element 2, namely: a first semi-conductive layer 3 known as the "internal semi-conductive layer", an electrically insulating layer 4, a second semi-conductive layer 5 known as the "external semi-conductive layer", a metal shield 6 for earthing and/or protection, and an outer protective sheath 7.

The electrically insulating layer 4 is an extruded non-crosslinked layer, obtained from the polymer composition as defined in the invention.

The semi-conductive layers 3 and 5 are thermoplastic (i.e. non-crosslinked) extruded layers.

The presence of the metal shield 6 and the outer protective sheath 7 is preferential, but not essential, as this cable structure per se is well known to the skilled person.

Examples

1. Polymer Compositions

Compositions I1, I2 and I3 in accordance with the invention, i.e. comprising at least one polypropylene-based thermoplastic polymer material and at least one oxygen-containing compound having a melting temperature of about 110° C. or more as a water tree reducing agent, were compared to a comparative composition C1, the composition C1 corresponding to a composition comprising a polypropylene-based thermoplastic polymer material identical to that used for the compositions of the invention I1, I2 and I3, but not comprising an oxygen-containing compound as defined in the invention.

Table 1 below lists the above-mentioned polymer compositions in which the amounts of the compounds are expressed as percentages by weight, based on the total weight of the polymer composition.

TABLE 1

| Polymer compositions | | C1 (*) | I1 | I2 | I3 |
|---|---|---|---|---|---|
| heterophasic propylene copolymer A | | 53.8 | 52.3 | 48.8 | 51.3 |
| heterophasic propylene copolymer B | | 15 | 15 | 15 | 15 |
| linear low-density polyethylene | | 25 | 25 | 25 | 25 |
| oxygen-containing compound 1 | | 0 | 1.5 | 0 | 0 |
| oxygen-containing compound 2 | | 0 | 0 | 5 | 2.5 |
| dielectric | mineral oil | 5.4 | 5.4 | 5.4 | 5.4 |
| liquid | benzophenone | 0.3 | 0.3 | 0.3 | 0.3 |
| antioxidant | | 0.5 | 0.5 | 0.5 | 0.5 |

(*) Comparative composition not part of the invention

The origin of the compounds in Table 1 is as follows:

- heterophasic propylene copolymer A marketed by LyondellBasell Industries with the product name Moplen EP2967;
- heterophasic propylene copolymer B marketed by LyondellBasell Industries with the product name Adflex® Q 200F;
- linear low-density polyethylene marketed by ExxonMobil Chemicals with the product name LLDPE 1002 YB;
- oxygen-containing compound 1 marketed by Perstorp with the product name Voxtar D50, with a melting temperature of 222° C.;
- oxygen-containing compound 2 marketed by Honeywell under the product number A-C 907 P, with a saponification index of 87, and a melting temperature of 145° C. for composition I2; and marketed by Clariant under the product number Licocene 6452, with an acid number of 41, and a melting temperature of 134° C. for composition I3;
- dielectric liquid comprising about 5.4% by weight of a naphthenic mineral oil marketed by Nynas with the product name Nyflex 223 for compositions C1, I1, I2; and a naphthenic mineral oil marketed by Nynas with the product name Nyflex BNS28 for composition I3; and about 0.3% by weight of benzophenone marketed by Sigma-Aldrich under the product number B9300; and
- antioxidant marketed by Ciba with the product name Irganox B 225 which includes an equimolar mixture of Irgafos 168 and Irganox 1010.

2. Preparation of Non-Crosslinked Layers and Cables

The compositions listed in Table 1 are implemented as follows.

The following components: mineral oil, antioxidant and benzophenone of compositions C1, I1, I2 and I3 referenced in Table 1, for each layer to be considered, are metered and mixed under stirring at about 75° C., in order to form a liquid mixture comprising the dielectric liquid.

The liquid mixture is then mixed with the following components: heterophasic propylene copolymer A, heterophasic propylene copolymer B, low-density polyethylene, and optionally oxygen-containing compound 1 or 2 of compositions C1, I1, I2 and I3 referenced in Table 1, for each polymer layer to be considered, in a container. Then the resulting mixture is homogenised using a Berstorff twin-screw extruder at a temperature of about 145 to 180° C., then melted at about 200° C. (screw speed: 80 rpm).

The homogenised and melted mixture is then put in the form of granules.

Cables are manufactured with a laboratory extruder and subjected to electrical characterizations. Each of the cables comprises:

- an electrically conductive element with a cross section of 1.4 to 1.5 mm,
- a first semi-conductive layer surrounding said electrically conductive element with a thickness of 0.7 mm,
- an electrically insulating polymer layer obtained from the polymer composition of the invention I1 or I2 or I3, or a comparative polymer composition C1, said electrically insulating polymer layer surrounding said first semi-conductive layer, and
- a second semi-conductive layer surrounding said electrically insulating layer.

The cables have a total external diameter of about 6.2 mm and a total length of about 200 m. They are stripped of the second semi-conductive layer to a thickness of 150 μm.

The electrically insulating layer is 1.5 mm thick.

The semi-conductive layers are thermoplastic layers obtained from a composition comprising at least one polypropylene-based thermoplastic polymer material, and at least one conductive filler in an amount sufficient to render the layers semi-conductive.

This results in the electric cables Ci1, Ci2, Ci3 and Cc1, respectively, each comprising four extruded layers. The electrically conductive element with a cross section of 1.4 to 1.5 mm is then removed and replaced by an electrically conductive element with a cross section of 0.75 to 0.8 mm in order to be able to put water between said electrically conductive element and the internal semi-conductive layer.

Breakdown tests before and after ageing in a wet environment were then carried out.

The method used is that described in the document "*Model Cable Test for Evaluating the Ageing Behaviour under Water Influence of Compounds for Medium Voltage Cables*", H. G. Land and Hans Schädlich, pages 177 to 182, published during the "Conference Proceedings of Jicable 91", 24-28 Jun. 1991, in Versailles, France.

This method consists first in performing breakdown tests with an alternating voltage with a frequency of 50 Hz on "unaged" samples (conditioned at 90° C. for 16 hours in a non-wet environment) of electric cables Ci1, Ci2, Ci3 and Cc1 to determine the initial value of the breakdown voltage, and then to perform these breakdown tests on "aged" samples of electric cables Ci1, Ci2, Ci3 and Cc1, powered alternately, in a water tank heated to 70° C. for 1000 hours (according to the conditions referenced "Ageing 2" in said document) and in the presence of water heated to 85° C. between the conductor and the "internal semi-conductive layer" to determine their breakdown voltage after 1000 hours.

The breakdown electric field (in kV/mm) of the electric cable corresponds to the voltage required to form an electric arc within the cable. It is typically returned to the electric field through the thickness of the electrically insulating layer, between the first semi-conductive layer (or internal semi-conductive layer) and the second semi-conductive layer (or external semi-conductive layer).

The results of the breakdown voltages are summarised in Table 2 below. 1.

TABLE 2

| Cable | Initial value (kV/mm) | Value after 1000 h (kV/mm) |
|---|---|---|
| Cc1 (*) | 130 | 41 |
| Ci1 | 58 | 49 |
| Ci2 | 95 | 81 |
| Ci3 | 133 | 77 |

(*) Comparative composition not part of the invention

All these results show that the incorporation of an oxygen-containing compound as defined in the invention into a polymer layer, in particular an electrically insulating polypropylene polymer-based layer, results in very good ageing resistance and improved resistance to water trees.

The invention claimed is:

1. An electric cable comprising:

at least one elongated electrically conductive element; and at least one polymer layer surrounding said elongated electrically conductive element, wherein the polymer layer is obtained from a polymer composition that has at least one polypropylene-based thermoplastic polymer material having at least two heterophasic propylene copolymers, as a propylene copolymer $P_1$, said at least two heterophasic propylene copolymers having a different elastic modulus from one another, with a first of said at least two heterophasic propylene copolymers having elastic modulus of about 50 to 550 MPa and a second of said at least two heterophasic propylene copolymers having elastic modulus of about 600 to 1200 MPa, said polymer composition further comprising at least one water tree reducing agent, said water tree reducing agent being an oxygen-containing compound having a melting temperature of 110° C. or more, and wherein said oxygen containing compound is selected from aliphatic polyols and polyols having at least two primary alcohol functions.

2. The electric cable according to claim 1, wherein the oxygen-containing compound has a melting temperature of 120° ° C. or more.

3. The electric cable according to claim 1, wherein the oxygen-containing compound has a molecular weight ranging from 200 to 5000000 g/mol.

4. The electric cable according to claim 1, wherein the oxygen-containing compound is dipentaerythritol.

5. The electric cable according to claim 1, wherein the polymer composition comprises from 0.1 to 15% by weight of the oxygen-containing compound, based on the total weight of the polymer composition.

6. The electric cable according to claim 1, wherein the polypropylene-based thermoplastic polymer material comprises at least 50% by weight of propylene polymer(s), based on the total weight of the polypropylene-based thermoplastic polymer material.

7. The electric cable according to claim 1, wherein the polypropylene-based thermoplastic polymer material further comprises an olefin homopolymer or copolymer $P_2$.

8. The electric cable according to claim 1, wherein the polymer composition further comprises at least 5% by weight of a dielectric liquid.

9. The electric cable according to claim 8, wherein the polymer composition further comprises at least 5% by weight of mineral oil as the dielectric liquid.

10. The electric cable according to claim 9, wherein the polymer composition further comprises at least 0.5% by weight of benzophenone in the dielectric liquid.

11. The electric cable according to claim 1, wherein the polymer layer is a non-crosslinked layer.

12. The electric cable according to claim 1, wherein the polymer layer has a reduction in the breakdown voltage after ageing in a wet environment of at most 30%.

13. The electric cable according to claim 1, wherein said electric cable comprises:

at least one semi-conductive layer surrounding the elongated electrically conductive element, and at least one electrically insulating layer surrounding the elongated electrically conductive element, at least one of the semi-conductive and electrically insulating layers is said at least one polymer layer.

* * * * *